United States Patent
Tsirkin et al.

(10) Patent No.: US 11,709,716 B2
(45) Date of Patent: Jul. 25, 2023

(54) HARDWARE OFFLOAD SUPPORT FOR AN OPERATING SYSTEM OFFLOAD INTERFACE USING OPERATION CODE VERIFICATION

(71) Applicant: Red Hat, Inc., Raleigh, NC (US)

(72) Inventors: Michael Tsirkin, Lexington, MA (US); Jesper Brouer, Frederikssund (DK)

(73) Assignee: Red Hat, Inc., Raleigh, NC (US)

( * ) Notice: Subject to any disclaimer, the term of this patent is extended or adjusted under 35 U.S.C. 154(b) by 170 days.

(21) Appl. No.: 16/551,522

(22) Filed: Aug. 26, 2019

(65) Prior Publication Data

US 2021/0064443 A1    Mar. 4, 2021

(51) Int. Cl.
G06F 9/50 (2006.01)
G06F 9/455 (2018.01)
G06F 8/41 (2018.01)

(52) U.S. Cl.
CPC ............ *G06F 9/5088* (2013.01); *G06F 8/443* (2013.01); *G06F 9/45508* (2013.01); *G06F 9/45525* (2013.01); *G06F 9/45558* (2013.01); G06F 2009/45575 (2013.01); G06F 2009/45595 (2013.01); G06F 2209/509 (2013.01)

(58) Field of Classification Search
CPC .... G06F 9/5088; G06F 9/45508; G06F 8/443; G06F 9/45525; G06F 9/45558; G06F 2009/45595; G06F 2209/509; G06F 2009/45575; G06F 9/545
See application file for complete search history.

(56) References Cited

U.S. PATENT DOCUMENTS

| | | | |
|---|---|---|---|
| 7,496,961 | B2 | 2/2009 | Zimmer et al. |
| 7,640,591 | B1 | 12/2009 | Tripathi et al. |
| 8,250,641 | B2 | 8/2012 | Morgan et al. |
| 8,938,611 | B1 | 1/2015 | Zhu et al. |
| 9,166,988 | B1 | 10/2015 | Shin et al. |

(Continued)

FOREIGN PATENT DOCUMENTS

CN        103023912 A       4/2013

OTHER PUBLICATIONS

Borkmann et al. BPF and XDP Reference Guide, Nov. 5, 2018, [retrieved on Apr. 23, 2021] Retrieved from <URL://github.com/cilium/cilium/blob/5913999bfcb6de31791a78a6c379e2f7a3f0b499/Documentation/bpf.rst>, pp. 1-50 (Year: 2018).*

(Continued)

*Primary Examiner* — Meng Al T An
*Assistant Examiner* — Hsing Chun Lin
(74) *Attorney, Agent, or Firm* — Lowenstein Sandler LLP

(57) ABSTRACT

A method may include receiving, by a privileged component executed by a processing device, bytecode of a packet processing component from an unprivileged component executed by the processing device, analyzing, by the privileged component, the bytecode of the packet processing component to identify whether the bytecode comprises a first command that returns a redirect, analyzing, by the privileged component, the bytecode of the packet processing component to identify whether the bytecode comprises a second command that returns a runtime computed value, and responsive to determining that the bytecode comprises the first command or the second command, setting a redirect flag maintained by the privileged component.

19 Claims, 6 Drawing Sheets

(56) References Cited

U.S. PATENT DOCUMENTS

| | | | |
|---|---|---|---|
| 9,183,021 B2* | 11/2015 | Dinn | G06F 9/45525 |
| 9,276,875 B2 | 3/2016 | Dong et al. | |
| 9,419,897 B2 | 8/2016 | Cherian et al. | |
| 9,557,992 B2 | 1/2017 | Tashiro et al. | |
| 10,423,358 B1* | 9/2019 | Foo | G06F 3/0656 |
| 2006/0282660 A1 | 12/2006 | Varghese et al. | |
| 2012/0185633 A1* | 7/2012 | Sano | G06F 15/17381 710/316 |
| 2013/0227556 A1* | 8/2013 | Tsirkin | G06F 21/53 718/1 |
| 2014/0269379 A1 | 9/2014 | Holbrook et al. | |
| 2014/0296379 A1 | 10/2014 | Christiano et al. | |
| 2014/0317677 A1 | 10/2014 | Vaidya et al. | |
| 2015/0207662 A1 | 7/2015 | Basso et al. | |
| 2016/0080414 A1 | 3/2016 | Kolton et al. | |
| 2016/0277447 A1 | 9/2016 | Pope et al. | |
| 2016/0299777 A1 | 10/2016 | Tsirkin | |
| 2016/0380865 A1 | 12/2016 | Dubal et al. | |
| 2017/0093677 A1 | 3/2017 | Skerry et al. | |
| 2017/0104679 A1 | 4/2017 | Sunavala et al. | |
| 2017/0155724 A1 | 6/2017 | Haddad et al. | |
| 2017/0171159 A1 | 6/2017 | Kumar et al. | |
| 2017/0177396 A1 | 6/2017 | Palermo et al. | |
| 2017/0289068 A1 | 10/2017 | Palermo et al. | |
| 2018/0254981 A1 | 9/2018 | Babu et al. | |
| 2019/0044812 A1 | 2/2019 | Loftus et al. | |
| 2019/0050273 A1 | 2/2019 | Tamir et al. | |
| 2019/0068491 A1 | 2/2019 | Tsirkin | |
| 2019/0205140 A1* | 7/2019 | Grisenthwaite | G06F 21/71 |
| 2020/0341885 A1* | 10/2020 | Plummer | G06F 9/3802 |

OTHER PUBLICATIONS

Rediger et al., Network Function Offloading in Virtualized Environments, Jul. 5, 2017, pp. 1-71 (Year: 2017).*

Hlavatý et al., Network Interface Controller Offloading in Linux, 2018, pp. 1-80 (Year: 2018).*

Kicinski, Jakub and Viljoen, Nicolaas, Netronome Systems Cambridge, United Kingdom, "eBPF Hardware Offload to SmartNICs: CLS BPF and XDP", https://open-nfp.org/documents/1/eBPF_HW_OFFLOAD_HNiMne8.pdf, Nov. 10, 2016, 6 pages.

Hoiland-Jorgensen, Toke et al., Karlstad University; Red Hat; Cilium.io; Quantonium Inc.; Cumulus Networks, "The Express Data Path: Fast Programmable Packet Processing in the Operating System Kernel", https://dl.acm.org/citation.cfm?id=3281443, Dec. 4-7, 2018, 13 pages.

Scholz, Dominik, et al., Chair of Network Architectures and Services, Department of Informatics, Technical University of Munich, "Performance Implications of Packet Filtering with Linux eBPF", https://www.net.in.tum.de/fileadmin/bibtex/publications/papers/ITC30-Packet-Filtering-eBPF-XDP.pdf, Oct. 21, 2018, 9 pages.

Kicinski, Jakub, Netronome Systems Santa Clara, United States, "XDP Hardware Offload: Current Work, Debugging and Edge Cases", https://www.netronome.com/media/documents/viljoen-xdpoffload-talk_2.pdf, 5 pgaes.

Unknown. "Network Functions Virtualization". http://www.rulepaper.com/COURSE%20SET%201/pdf/Network_Functions_Virtualization.PDF. Retrieved on Aug. 22, 2017. 4 pages.

Unknown. "2017 NFV Report Series Part I: Foundations of NFV: NFV Infrastructure and VIM". 2017. http://events.windriver.com/wrcd01/wrcm/2017/06/report-foundation-of-nfv-infrastructure-and-vim-2.pdf. Retrieved on Jun. 28, 2017. 55 pages.

Dredge, Simon. Dec. 31, 2015. "Accelerating the NFV Data Plane: SR-IOV and DPDK . . . in my own Words". www.metaswitch.com/the-switch/accelerating-the-nfv-data-plane. Retrieved on Jun. 28, 2017.15 pages.

Unknown. "Software Defined Networking SDN100". 2017. https://training.mirantis.com/wp-content/uploads/2017/06/Mirantis-SDN100.pdf. Retrieved on Jun. 28, 2017. 2 pages.

Cartee et al. Apr. 3-6, 2017. "Open Networking Summit 2017". https://ons2017.sched.com/event/9ktv/io-visor-programmable-in-kernel-data-plane-with-ebpf-and-xdp-wendy-cartee-deepa-kalani-io-visor-project. Retrieved on Jun. 27, 2017. 3 pages.

Kourai K., Azumi, T., & Chiba, S. (Apr. 1, 2014). Efficient and Fine-grained VMM-level Packet Filtering for Self-protection. International Journal of Adaptive, Resilient and Autonomous Systems (IJARAS), 5(2), 83-100. 18 pages.

Fitzmacken, Neira, Squillace, Diogenes (Jan. 9, 2017) Getting started with Microsoft Azure security. Retrieved May 26, 2017 from https://docs.microsoft.com/enus/azure/security/azuresecurityget-tingstarted. 11 pages.

USPTO, Office Action for U.S. Appl. No. 15/687,300, dated Jun. 13, 2019.

USPTO, Office Action for U.S. Appl. No. 15/688,794, dated Apr. 4, 2019.

USPTO, Notice of Allowance for U.S. Appl. No. 15/687,300, dated Oct. 18, 2021.

Firestone, "VFP: A Virtual Switch Platform for Host SON in the Public Cloud", 2017, 14th USENIX Symposium in the Networked Systems Design and Implementation (NSDI'17), pp. 315-328. (Year: 2017).

MA et el., "A Design of Firewall Based on Feedback of Intrusion Detection System in Cloud Environment", 2019, pp. 1-6 (Year: 2019).

USPTO, Final Office Action for U.S. Appl. No. 15/687,300, dated Nov. 21, 2019.

USPTO, Advisory Action for U.S. Appl. No. 15/687,300, dated Feb. 13, 2020.

USPTO, Office Action for U.S. Appl. No. 15/687,300, dated Jul. 8, 2020.

USPTO, Final Office Action for U.S. Appl. No. 15/687,300, dated Feb. 11, 2021.

USPTO, Advisory Action for U.S. Appl. No. 15/687,300, dated May 19, 2021.

USPTO, Notice of Allowance for U.S. Appl. No. 15/688,794, dated Nov. 20, 2019.

* cited by examiner

US 11,709,716 B2

HARDWARE OFFLOAD SUPPORT FOR AN OPERATING SYSTEM OFFLOAD INTERFACE USING OPERATION CODE VERIFICATION

TECHNICAL FIELD

The disclosure is generally related to networking computing systems, and is more specifically related to hardware offload support for an operating system (OS) offload interface using operation code (opcode) verification.

BACKGROUND

In digital communications networks, packet processing refers to the techniques that are applied to a packet of data or information as it moves through the various network elements of a communications network. Within any network-enabled device (e.g., router, switch, firewall, network element or terminal such as a computer or smartphone), a packet processing subsystem manages the traversal of packets through a multi-layered network or protocol stack from lower, physical and network layers to the application layer.

Packet processing systems often apply packet filter rules (PFRs) (also known as Internet Protocol (IP) filter rules) to examine incoming packets. A packet filter implementing the PFRs examines the header of each packet based on a specific set of rules, and on that basis decides to allow the packet to pass through the filter (called an Accept/Pass Action) or prevent the packet from passing through (called a Drop Action). Other actions are also possible to be implemented by more advanced versions of packet filters. Packet filters have a significant impact on performance, both throughput and latency, since typically multiple PFRs are checked for every received packet on an interface before the packet is forwarded or terminated.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
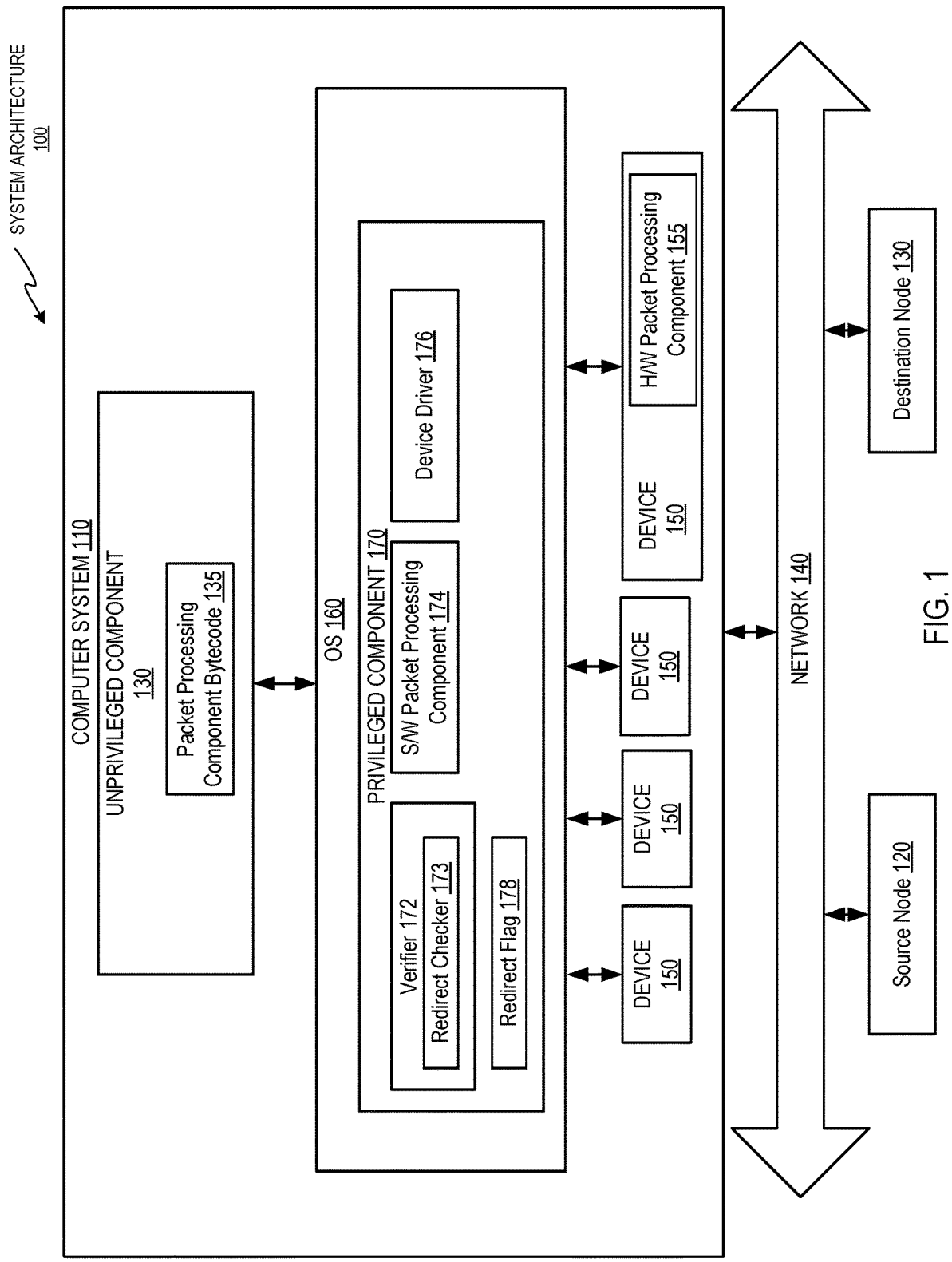
FIG. 1 depicts a high-level diagram of an example system architecture operating in accordance with one or more aspects of the disclosure.

Implementations of the disclosure are directed to hardware offload support for an operating system (OS) offload interface using operation code (opcode) verification. In one implementation, an OS offload interface refers to packet processing components that process and filter network packets in a computing system. Packet processing refers to the variety of techniques that are applied to a packet of data or information as it moves through various network elements of a communications network. Within any network-enabled device (e.g., router, switch, firewall, network element or terminal such as a computer or smartphone), a packet processing subsystem manages the traversal of the packets through a multi-layered network or protocol stack from lower, physical and network layers to the application layer.

Packet processing components often apply packet filter rules (PFRs) (also known as Internet Protocol (IP) filter rules) to examine incoming packets. A packet filter implementing the PFRs examines the header of each packet based on a specific set of rules, and on that basis decides to allow the packet to pass through the filter (called an Accept/Pass Action) or prevent the packet from passing through (called a Drop Action). More advanced versions of packet filters may perform other actions (e.g., abort, redirect, transmit) as well. Packet filters have a significant impact on performance, both throughput and latency, since typically multiple PFRs are checked for every received packet on an interface before the packet is forwarded or terminated. Scaling up the number of rules and/or the rule complexity also significantly impacts performance.

One way to implement PFRs is by using a software-based library executing on one or more processor cores of a computing platform. The Berkeley Packet Filter (BPF) has become a standard mechanism for packet filtering in many operating systems (OSes). The BPF was originally used to efficiently select which packets are to be taken from a packet stream. The basic idea is that a set of filter rules is compiled into bytecode that is then applied to each inspected packet to decide whether the packet is passed or ignored. The BPF allowed for constructing high-level PFRs, such as "only pass packets from 'example.com' with the top destination port X" and having them compiled to run efficiently.

The BPF has been extended in the kernel of some OSes and moved out of network subsystem code. One example extension of the BPF is eXpress Data Path (XDP), which provides a programmable network data path in the OS kernel, providing bare metal packet processing at the lowest point in the software application stack. One change involved in the extension of BPF to the OS kernel is the addition of "maps", which are key-value sets that allow for the keeping of state information between packet inspection events and the passing of state information back to the user. In the present disclosure, the extension of BPF into the OS kernel is referred to as an OS offload interface or, more generally, a packet processing component.

Some network devices offer BPF extension support in network input/output (I/O) devices, such as in Network Interface Cards (NICs). This support of BPF and BPF extensions (e.g., packet processing components) in hardware network devices is referred to herein as hardware offload support or hardware offload. Hardware offload support for a packet processing component enables more efficient and quicker network packet processing. For example, the packet processing component may be offloaded to a network I/O device, such as a Network Interface Card (NIC), which can execute the packet processing component and apply the filter rules without involving software execution at the processor.

In some systems, a packet processing component may provide the following return responses when a network packet is received: drop, abort, pass, redirect, and transmit.

However, with hardware offload of a packet processing component, the redirect action may not be supported by the hardware offloader device (e.g., NIC card). This is because the redirect action involves a redirection of a packet to a different network device interface or another application. The network device providing hardware offload for the packet processing component may not have the capability to redirect a received packet to another network interface or application. This inability to properly handle redirect actions can cause portability issues for users of the packet processing component. For example, for virtual machines (VMs) migrating between hosts with and without redirect support, it should be known in advance whether the packet processing component uses redirect so that a determination can be made whether the VM can be successfully migrated. However, information regarding redirect support is typically not provided as metadata with packet processing components.

Aspects of the disclosure address the above and other deficiencies by providing a verifier of a privileged component of a computing system. The privileged component may refer to a kernel of an OS or a hypervisor that manages one or more VMs. The verifier may be an opcode verifier and may perform verification of bytecode of a packet processing component received from an unprivileged component (e.g., an application, a VM, etc.) of the computing system. Bytecode and opcode are referred to throughout this disclosure. Bytecode may refer to a representation of a program (as a sequence of bytes). Opcode may refer to a number that represents a single instruction. The processor in a computer reads values from memory and interprets these as instructions. Such a sequence of values is called "machine code". Machine code consists of many individual instructions. An instruction may appear in the memory as a number, say 0x1F38520A in hexadecimal notation. Depending on how the processor is designed, the first eight bits may determine what the instruction is. For example, 0x1F may mean "add". As such, 0x1F is the opcode for addition. Bytecode is similar to machine code. Its instructions are also represented by numbers, and the "opcode" identifies which instruction it is. The difference between byte code and machine code (opcode) is that bytecode is not designed to be executed by the processor directly, but rather by another program.

In one implementation, the verifier may include a redirect checker that detects a command to return a redirect action in the bytecode of the packet processing component. The redirect checker can pass over all opcodes in the packet processing component bytecode provided by the unprivileged component. If the redirect checker detects a command to return a redirect, it can set a redirect flag that indicates a redirect action is detected in the packet processing component.

In some implementations, a command to return a redirect may not be explicit in the packet processing component bytecode. For example, the opcode may return a value that is not known in advance, such as a value from a register, from a map (e.g., a data structure for storage of different data types, used to keep state between invocations of the packet processing component), or from memory. These values are discernable at runtime, but not directly discernable from the bytecode of the packet processing component. These values may be referred to herein as runtime-computed values that are generated during runtime of the application. In some implementations, a redirect action may be returned via such an unknown value detected in the bytecode. As such, in some implementations, the redirect checker also sets the redirect flag when the redirect checker detects that the opcode (within the bytecode) returns a values that is not known in advance (e.g., only known at runtime).

Once the verifier validates the packet processing component bytecode and the redirect checker completes its check, the privileged component may recognize that a hardware device, such as a NIC, provides hardware offload support for the packet processing component. The privileged component may then pass off the unprivileged component's request to load the packet processing component to the device driver for the device that provides the hardware offload support for the packet processing component. The device driver can check the redirect flag to determine whether a command to return a redirect is detected in the bytecode of the packet processing component. If the redirect flag is set, then the device driver may cause the packet processing component to be executed in a software implementation for each networking packet that is received. On the other hand, if the redirect flag is not set, then the device driver may cause the packet processing component to be loaded in the device to be executed in a hardware implementation for each networking packet that is received.

In some implementations, the techniques disclosed herein may be expanded beyond the packet processing context and applied to other use cases. For example, implementations of the disclosure may provide for operation code verification for unknown execution actions of any compiled instruction code. One example use case is detecting unsafe speculation due to indirect branch instructions in bytecode of an application. The verifier described herein can be extended to detect occurrence of such indirect branch instructions and set a flag indicating existence of the indirect branch. The flag can be used to notify the user and/or modify the instruction code to better enumerate potential unknown values in the bytecode to avoid the unsafe speculation caused by the indirect branch instruction.

The techniques disclosed herein may provide hardware offload support for an OS offload interface using opcode verification, where a privileged component executes a verifier to verify whether a redirect action is returned by bytecode of a packet processing component. In such an instance, the privileged component may avoid offloading the packet processing component to a hardware device that is not capable of supporting the redirect action, thereby increasing efficiency of a computer system by reducing power consumption and processor (e.g., central processing unit (CPU)) cycles that would be associated with a hardware offload that would be error-prone due to inability to support redirect actions.

FIG. 1 illustrates an example system architecture 100 in which implementations of the disclosure may operate. The system architecture 100 may include a computer system 110, a source node 120, and a destination node 130 coupled via a network 140. In one example, the computer system 110, the source node 120, and the destination node 130 may be host systems in a cluster in a data center. In another example, the computer system 110 may be a host system and the source node 120 and the destination node 130 may be virtual machines, hypervisors, and/or devices (e.g., virtual and/or physical NICs) running on the computer system 110 or another computer system. The network 140 may be a public network (e.g., the Internet), a private network (e.g., a virtual local area network (vLAN), a local area network (LAN), or a wide area network (WAN)), or a combination thereof. The network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, the network 140 may include a wired infrastructure (e.g., Ethernet).

The computer system 110 may comprise one or more processing devices communicatively coupled to memory devices and devices 150 (e.g., I/O devices, CD-ROM drive, physical NICs, etc.). The computer system 110 may be a server, a mainframe, a workstation, a personal computer (PC), a laptop, a mobile phone, a palm-sized computing device, or any suitable computing device. The computer system 110 runs a host operating system (OS) 160, which is an application that manages the hardware resources of the computer system 110 and that provides functions such as interprocess communication, scheduling, memory management, and so forth.

The host OS 160 may include and execute a privileged component 170. In one implementation, the privileged component 170 may be kernel. In some implementations, a kernel may also be referred to as a supervisor or supervisor component. The kernel is a computer program that is the core of the OS 160. The critical code of the kernel is usually loaded into a separate area of memory, which is protected from access by application programs or other, less critical parts of the OS 160. The kernel performs its tasks, such as running processes, managing hardware devices such as the hard disk, and handling interrupts, in this protected kernel space. In contrast, unprivileged components 130, such as application programs including browsers, word processors, audio or video players, or virtual machines (VMs), use a separate area of memory referred to as user space. This separation prevents user data and kernel data from interfering with each other and causing instability and slowness, as well as preventing malfunctioning unprivileged components 130 from crashing the entire OS 160.

In one implementation, the privileged component 170 is a hypervisor. A hypervisor may refer to an application that provides a virtual operating platform for a set of virtual machines (VMs). Each VM of the set of VMs may be an unprivileged component 130 of computer system 100. The hypervisor abstracts the physical layer of the computer system 110, including the processors, memory, I/O devices, network devices, and presents this abstraction to the VMs. The hypervisor may create, run, manage, and monitor various aspects of virtual machines operation, including the processing, and storage, memory, and network interfaces. The VMs may be implemented in computer instructions that emulate physical machines and may execute applications as though they were an actual physical machine. For example, a VM executes a guest operating system that may utilize the underlying virtual devices, including virtual processors, virtual memory, virtual I/O devices, and virtual NICs.

In one implementation, the unprivileged component 130 (e.g., application, VM, etc.) may generate a packet processing component using one or more rules for processing network packets. In one example, the packet processing component may be implemented using instructions (e.g., Berkeley Packet Filter bytecode) that can be, for example, specified by a user and provided to the unprivileged component 130.

As shown in FIG. 1, the packet processing component may be represented as packet processing component bytecode 135. Bytecode may refer to program code that has been compiled from source code into low-level code designed for a software interpreter. The bytecode may be executed by a virtual machine (such as a JVM) or further compiled into machine code, which is recognized by the processor. In one implementation, the packet processing component may be an XDP application. XDP provides a high performance, programmable network data path in the privileged component 170, such as a kernel or a hypervisor. XDP provides bare metal packet processing at the lowest point in an application stack. The one or more rules for processing network packets may be compiled into packet processing component bytecode 135 at the unprivileged component 130. For example, the packet processing component created by the unprivileged component 130 is compiled into packet processing component bytecode 135 using a packet processing library function. The library function may make a packet processing system call to the privileged component 160.

Upon receiving the system call, the privileged component 170 may validate the packet processing component bytecode 135. Validating the packet processing component bytecode 135 via the privileged component 170 ensures that the packet processing component can be run properly at the privileged component 170. Once the bytecode 135 is validated, machine dependent assembly language code is inserted into the privileged component 170 as packet processing component 174 (e.g., in memory associated with the privileged component 170) or is loaded in a hardware device 150 in a hardware offload implementation of the packet processing component 155.

In one implementation, validating the packet processing component bytecode 135 at the privileged component 170 may include verifying the semantics of the system call and compiling the bytecode 135 into the machine dependent assembly language code. Specifically, verifying the packet processing component bytecode 135 may include verifying that the packet processing component can be granted a high privilege level of operation by not executing illegal instructions (e.g., changing arbitrary memory outside the packet buffer, executing back branches, running certain loops, sending data outside of packets, etc.).

In one implementation, a verifier 172 of the privileged component 170 may perform the verification of the packet processing component bytecode 135 received from the unprivileged component 130. The verifier 172 may be operation code (opcode) verifier. In one implementation, the verifier 172 may include a redirect checker 173. As noted above, the packet processing component may be offloaded to hardware (e.g., device 150) to enable more efficient and quicker network packet processing. For example, the packet processing component may be offloaded to a NIC card, which can execute the packet processing component and apply the filter rules without involving software execution at the processor.

As discussed above, a packet processing component may generally provide one or more of the following return responses when a network packet is received: drop, abort, pass, redirect, and transmit. However, with hardware offload of a packet processing program, the redirect return action may not be supported by the hardware offloader (e.g., the NIC card). This can cause portability issues for users of the packet processing component. For example, for VMs migrating between hosts with and without redirect support, it should be known in advance whether the packet processing component uses redirect so that the user can know whether the VM can be successfully migrated. However, applications generally do not supply this information as metadata with packet processing components.

Implementations of the disclosure provide the redirect checker 173 to detect a command to return a redirect action in the packet processing component bytecode 135. The redirect checker 173 can pass over all opcodes in the packet processing component bytecode 135 provided by the unprivileged component 130. If the redirect checker 173 detects a command to return a redirect, it can set a redirect flag 178 that indicates a redirect action is detected in the packet processing component bytecode 135. In one implementations, the redirect flag 178 may be maintained in memory of the privileged component 170 (e.g., kernel memory, hypervisor memory, etc.). For example, the redirect flag 178 may be included with system flags maintained by the privileged component 170.

In some implementations, a command to return a redirect may not be explicit in the packet processing component bytecode 135. For example, an opcode (of the bytecode 135) may return a value that is not known in advance (e.g., runtime-computed value generating during runtime of the application), such as a value from a register, from a map (e.g., a data structure for storage of different data types, used to keep state between invocations of the packet processing component), or from memory. These values are discernable at runtime, but not discernable from the bytecode 135 of the packet processing component. In some implementations, a redirect action may be returned via an unknown value detected in the bytecode 135 at runtime. As such, in some implementation, the redirect checker 173 also sets the redirect flag 178 when the redirect checker 173 detects that the bytecode 135 returns a values that is not known in advance (e.g., known at runtime).

Once the verifier 172 validates the packet processing component bytecode 135 and the redirect checker 173 completes its check, the privileged component 170 may determine that a hardware device 150, such as a network I/O device (e.g., a NIC), provides hardware offload support for the packet processing component. In one implementation, the privileged component 170 may reference configuration data, such as a setting or a flag provided by the device driver 176, that indicates hardware offload for packet processing is supported by the device 150. The privileged component 170 may then pass off the unprivileged component's 130 request to load the packet processing component to the device driver 176 corresponding to the device 150 that provides the hardware offload support for the packet processing component. The device driver 176 can check the redirect flag 178 to determine whether a command to return a redirect is detected in the bytecode 135 of the packet processing component. If the redirect flag 178 is set, then the device driver 176 may cause the packet processing component to be executed in a software implementation 174 for each networking packet that is received. On the other hand, if the redirect flag 178 is not set, then the device driver 176 may cause the packet processing component to be loaded in the device 150 to be executed in a hardware implementation 155 for each networking packet that is received.

In a software implementation of the packet processing component 174, the privileged component 170 compiles the packet processing component into machine dependent assembly language code using, for example, a native compiler of the privileged component 170. The machine dependent assembly language code is inserted into a kernel "hook" in kernel code and is executed along with the privileged component 170. When incoming packets (e.g., networking packets) arrive at a network I/O device 150, the network I/O device 150 hardware passes each packet to the packet processing component 174 for processing in software.

In a hardware offload implementation of the packet processing component 155, the device driver 176 compiles the packet processing component into machine dependent assembly language code (e.g., native instructions for the device 150) using a compiler (e.g., a compiler, such as a last stage compiler, of the device driver 176). The machine dependent assembly language code is loaded in the device 150. In one implementation, the packet processing component 155 is implemented as settings and logic within the device (e.g., NIC) 150. When incoming packets (e.g., networking packets) arrive at the device 150, the device 150 processes each packet using hardware implementation of the packet processing component 155.

In some implementations, the privileged component 170 may provide a notification to the user of the unprivileged component 130 when the redirect flag 178 is set and hardware offload is not implemented. For example, the notification may include a suggestion that users rewrite the packet processing component to enumerate all possible values for a potential return value. For example, the notification may suggest that the user rewrite instruction code according to the below example:

---
Original:
    return map
Rewritten:
    if (map == XDP_DROP)
    return XDP_DROP
    else
    return XDP_PASS
---

In response to the feedback to provide explicit enumeration, packet processing component may be generated that includes any commands to return redirects explicitly in the instruction code. As a result, the redirect flag 178 may be more accurately set for these packet processing components. In some implementations, compilers and/or code generators may also be modified to emit compiled code that enumerates known values to reduce the unnecessary setting of the redirect flag 178.

In one example implementation, if a packet is sent from a source node 120 and destined for a destination node 130 via an unprivileged component 130 (e.g., a router application, a VM, etc.), the packet processing component (either hardware implementation 155 or software implementation 174) may process the received packet in view of one or more rules. For example, a first rule of the rules may cause the packet processing component 155, 174 to process (e.g., modifying encapsulation headers, adding encapsulation headers, removing encapsulation headers, encrypting data in the packet, decrypting data in the packet, etc.) the packet for transmission to the destination node 130, without providing the packet to the unprivileged component 130 for routing. In instances where the encapsulation headers are modified, a destination address for the packet may be changed.

Implementations of the disclosure may also be expanded into other applications beyond the packet processing component context discussed above. For example, implementations of the disclosure may provide for operation code verification for unknown execution actions of any compiled instruction code. In the context of indirect branch instructions, these type of instructions are often not safely speculated in a computing system The verifier 172 discussed above may be adapted to set a flag responsive to loaded bytecode including an indirect jump (or indirect branch) instruction. If the flag is set, then execution of the instruction code of the application may be denied and/or a warning may be produced instructing the user to rewrite the instruction code to enumerate the unknown values. For example, the original code:

```
(*p)(args)
can be rewritten as
    if (p==foo)
        foo(args)
    else if (p==bar)
        bar(args)
```

Figure 2:
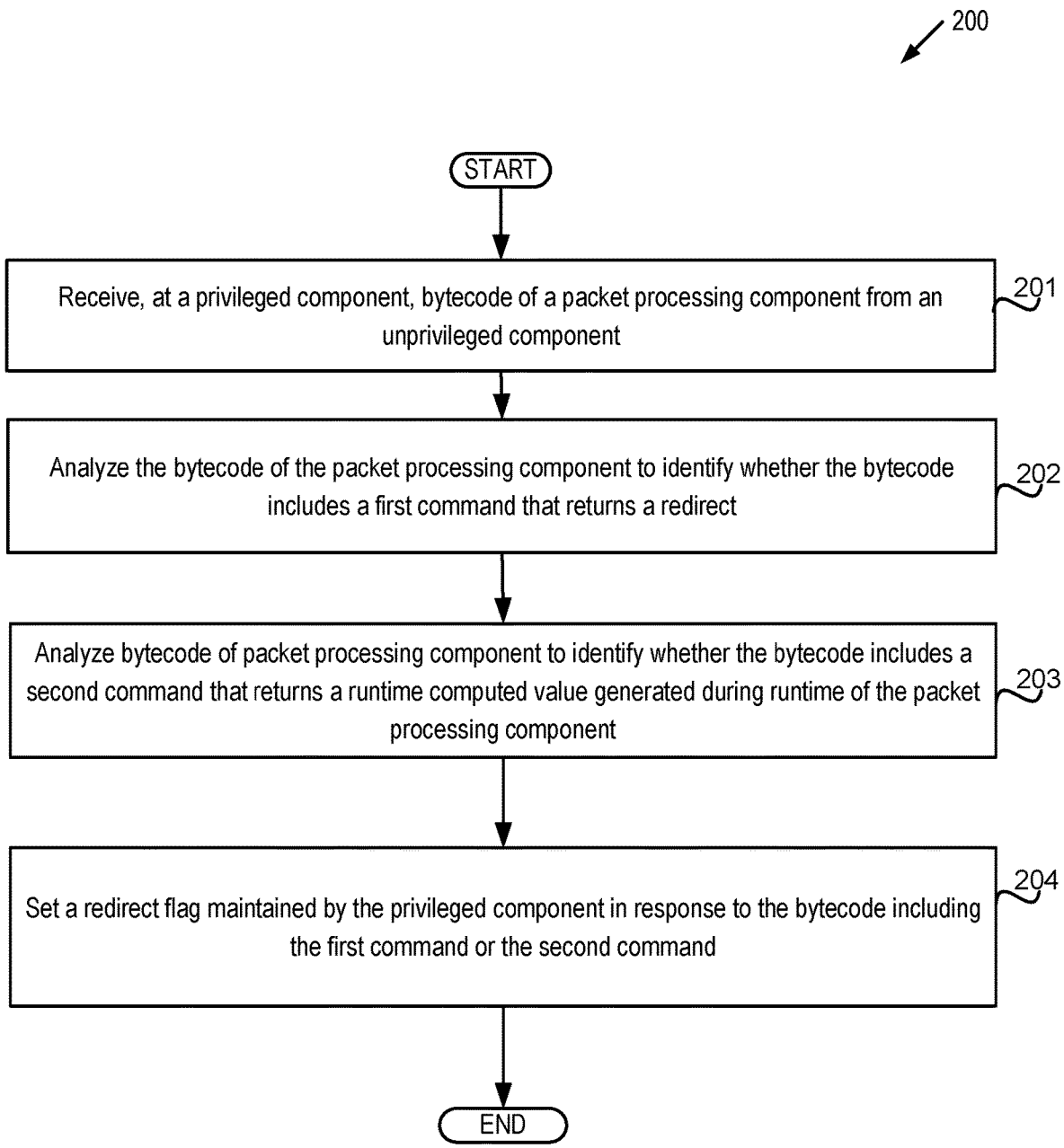
FIG. 2 depicts a flow diagram of an example method for hardware offload support for an OS offload interface using opcode verification, in accordance with one or more aspects of the disclosure.

FIG. 2 depicts a flow diagram of an example method 200 for hardware offload support for an OS offload interface using opcode verification, in accordance with one or more aspects of the present disclosure. Method 200 and each of its individual functions, routines, subroutines, or operations may be performed by one or more processing devices of the computer device executing the method. In certain implementations, method 200 may be performed by a single processing thread. Alternatively, method 200 may be performed by two or more processing threads, each thread executing one or more individual functions, routines, subroutines, or operations of the method. In an illustrative example, the processing threads implementing method 200 may be synchronized (e.g., using semaphores, critical sections, and/or other thread synchronization mechanisms). Alternatively, the processes implementing method 200 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by the privileged component 170 executed by one or more processing devices of the computer system 110.

Method 200 may begin at block 201. At block 201, a processing device may receive bytecode of a packet processing component from an unprivileged component. In one implementation, the unprivileged component may include an application or a VM. The packet processing component bytecode may be received at a privileged component on the same computing system as the unprivileged component. The privileged component may include a kernel of an OS or a hypervisor managing one or more VMs. The packet processing component may be represented as instructions implementing one or more rules for processing network packets. The packet processing component may also be referred to as an OS offload interface. One implementation of the packet processing component is an XDP application.

At block 202, the processing device may analyze the bytecode of the packet processing component to identify if the bytecode includes a first command that returns a redirect. At block 203, the processing device may analyze bytecode of the packet processing component to identify if the bytecode includes a second command that returns a runtime-computed value that is generated during runtime.

At block 204, the processing device may set a redirect flag if the bytecode either includes either the first command and/or the second command. In one implementation, in response to the redirect flag being set, hardware offload of the packet processing component may be denied and the packet processing component implemented in software instead. In some implementations, in response to the redirect flag being set, a notification may be provided to a user associated with the packet processing component, where the notification provides a suggestion to rewrite the code of the packet processing component to enumerate unknown returned values in the packet processing component. In some implementations, based on the notification, a compiler or a code generator may be modified to enumerate unknown values in the bytecode of the packet processing component.

Figure 3:
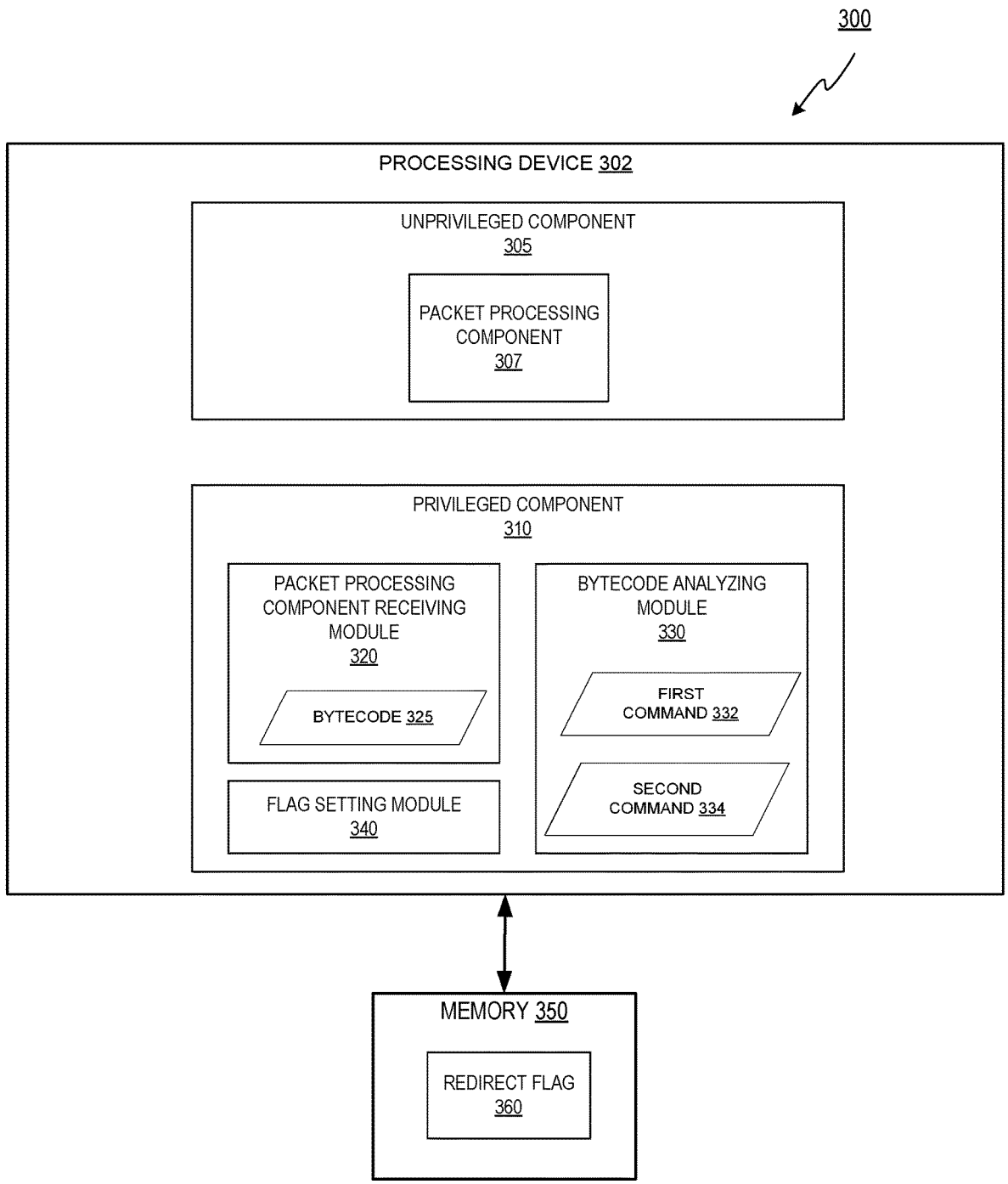
FIG. 3 depicts a block diagram of an example computer system, in accordance with one or more aspects of the disclosure.

FIG. 3 depicts a block diagram of an example computer system 300, in accordance with one or more aspects of the present disclosure. Computer system 300 may be the same or similar to the computer system 110 and may include one or more processing devices 302 and one or more memory devices 350. In the example shown, the processing device 302 of the computer system 300 may include an unprivileged component 305 and a privileged component 310. Unprivileged component 305 may be same as unprivileged component 130 described with respect to FIG. 1. Privileged component 310 may be same as privileged component 170 described with respect to FIG. 1. The unprivileged component 305 may include a packet processing component 307. The privileged component 310 may include packet processing component receiving module 320, bytecode analyzing module 330, and flag setting module 340. The privileged component 310 may execute each of the packet processing component receiving module 320, bytecode analyzing module 330, and flag setting module 340.

The packet receiving module 320 may receive bytecode 325 of a packet processing component 307 from an unprivileged component 305 executed by the processing device 302. The bytecode analyzing module 330 may analyze the bytecode 325 of the packet processing component to identify whether the bytecode 325 comprises a first command 332 that returns a redirect, The bytecode analyzing module 330 may also analyze the bytecode 325 of the packet processing component to identify whether the bytecode 325 comprises a second command 334 to that returns a value that is not known in advance of runtime of the packet processing component 307.

The flag setting module 340 may set, in response to determining that the bytecode 325 comprises the first command 332 or the second command 334, a redirect flag 360 maintained by the privileged component 310 in memory 350 of the system 300.

Figure 4:
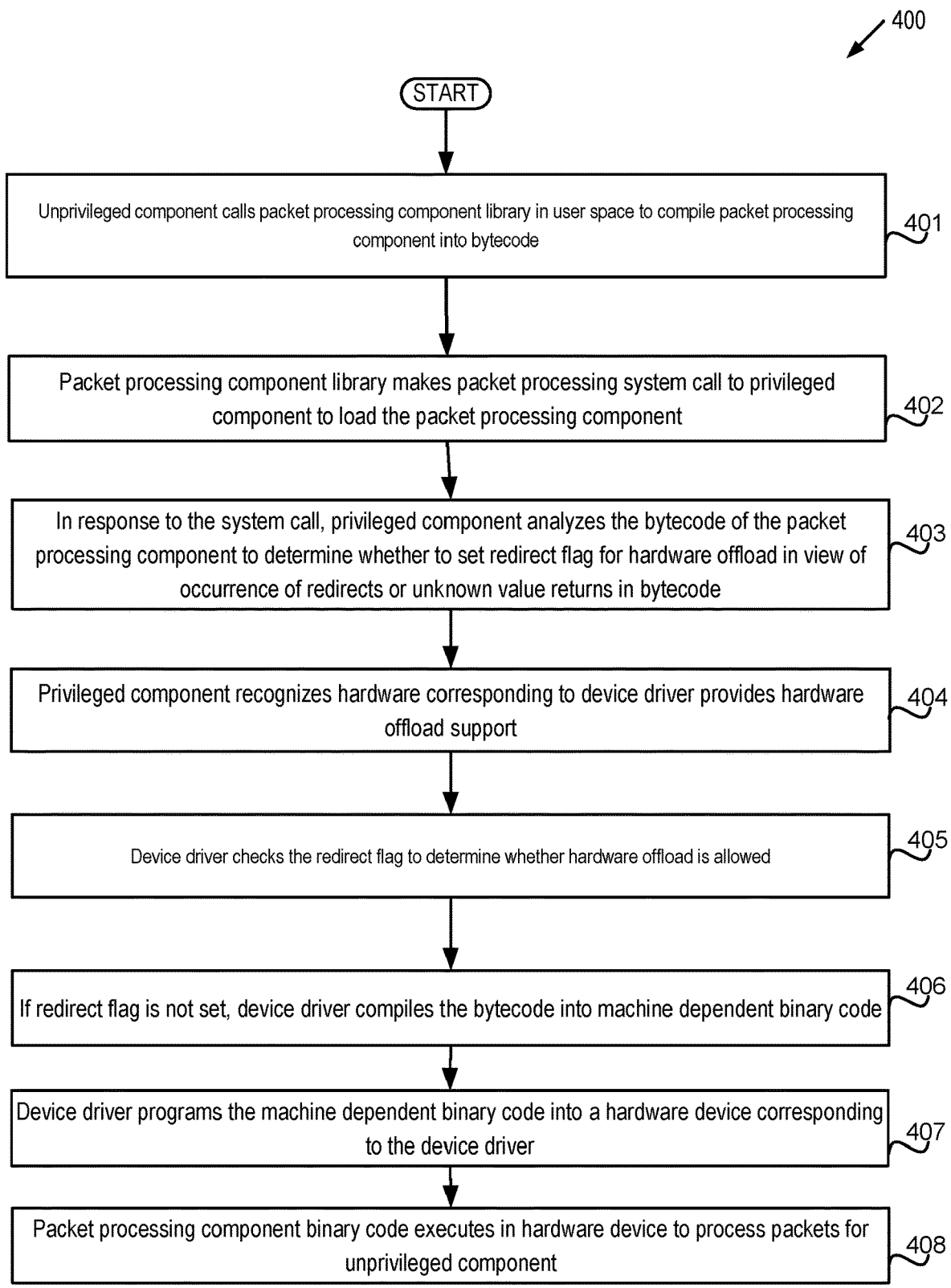
FIG. 4 depicts a flow diagram of an example method for a system supporting hardware offload support for an OS offload interface using opcode verification, in accordance with one or more aspects of the disclosure.

FIG. 4 depicts a flow diagram of an example method 400 for a system supporting hardware offload support for an OS offload interface using opcode verification, in accordance with one or more aspects of the disclosure. Method 400 includes operations performed by the computer system 110. Also, method 400 may be performed in the same or a similar manner as described above in regards to method 200. Method 400 may be performed by processing devices of the computer system 110 executing the unprivileged component 130 and privileged component 170.

Method 400 may begin at block 401. At block 401, the processing device may call, via an unprivileged component (e.g., application, VM, etc.), a packet processing component library in user space corresponding to the unprivileged component. The unprivileged component may comprise an application or a VM. In one implementation, the call to the packet processing library is to compile the packet processing component into bytecode. At block 402, the processing device makes, using the packet processing component library, a packet processing component system call to a privileged component (e.g., supervisor, kernel, hypervisor, etc.) to load the packet processing component.

At bock 403, the processing device, in response to the system call, analyzes the bytecode of the packet processing component at the privileged component. The privileged component may include a kernel of an OS executed by the processing device or a hypervisor executed by the processing device. The analysis of the bytecode by the privileged component is to determine whether to set a redirect flag for hardware offload of the packet processing component in view of occurrence of redirects or unknown value returns in the bytecode.

At block 404, the processing device, via the privileged component, recognizes that hardware corresponding to the device driver provides hardware offload support for the packet processing component. In one implementation, the privileged component may determine that the device driver provides hardware offload support by referring to configuration data corresponding to the device driver, where the configuration data may include an indicator of hardware offload support. At block 405, the processing device may, via the device driver, check the redirect flag to determine whether the hardware offload is allowed for the packet processing component. In one implementation, if the redirect flag is set, the hardware offload is denied for the packet processing component and the packet processing component is provided via a software implementation.

In one implementation, at block 406, if the redirect flag is not set, the device driver compiles the bytecode into machine dependent binary code (e.g., an assigned pattern of binary digits to represent characters, instructions, etc.). At block 407, the processing device may, via the device driver, program the machine dependent binary code of the packet processing component into a hardware device (e.g., a NIC) corresponding to the device driver. At block 408, the processing device may cause the binary code of the packet processing component to execute in the hardware device in order to process packets for the unprivileged component.

Figure 5:
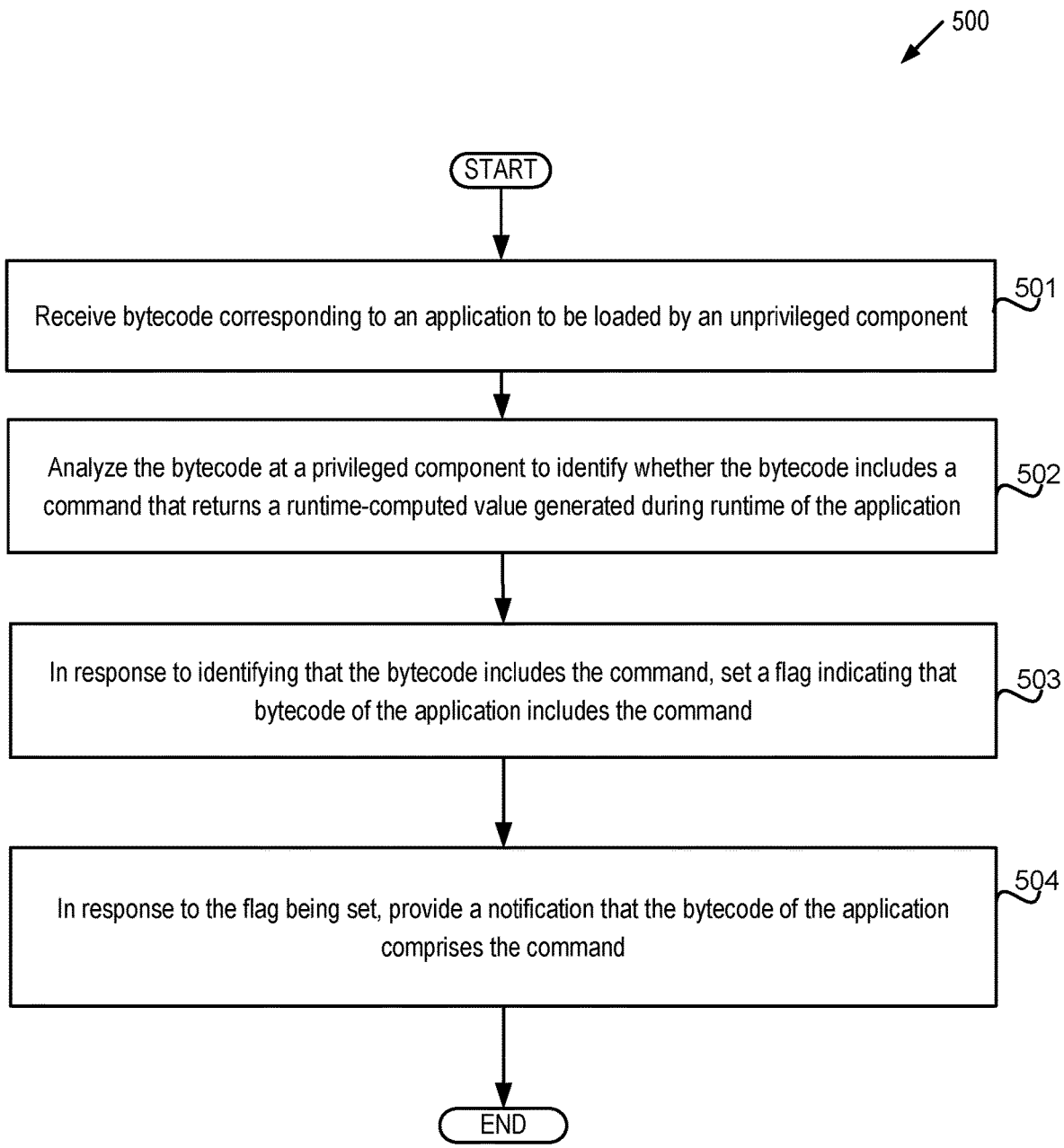
FIG. 5 depicts a flow diagram of an example method for using opcode verification to flag commands that return unknown values in bytecode, in accordance with one or more aspects of the disclosure.

FIG. 5 depicts a flow diagram of an example method 500 for using opcode verification to flag commands that return unknown values in bytecode, in accordance with one or more aspects of the disclosure. Method 500 includes operations performed by the computer system 110. Also, method 500 may be performed in the same or a similar manner as described above in regards to methods 200 and/or 400. Method 500 may be performed by processing devices of the computer system 110 executing the unprivileged component 130 and the privileged component 170.

Method 500 may begin at block 501. At block 501, the processing device may receive bytecode corresponding to an application to be loaded by an unprivileged component. The unprivileged component may be an application or a VM. At block 502, the processing device may analyze the bytecode at a privileged component. The privileged component may be a kernel of an OS or a hypervisor executing one or more VMs. The privileged component may analyze the bytecode to determine whether the bytecode includes a command that returns a runtime-computed value that is generated during runtime of the application. In one implementation, the command may be an indirect branch command (e.g., indirect jump instruction).

At block 503, the processing device may, in response to identifying that the bytecode includes the command, set a flag indicating that the bytecode of the application includes the command that returns the runtime-computed value that is generated during runtime of the application. At block 504, the processing device may, in response to the flag being set, provide a notification that the bytecode of the application comprises the command. In one implementation, the notification may inform a user that the application cannot be safely speculated and/or a suggestion on how to rewrite the instruction code of the application. In one implementation, the suggestion may include rewriting the code to enumerate runtime-computed values in order to avoid unsafe speculation in the bytecode.

Figure 6:
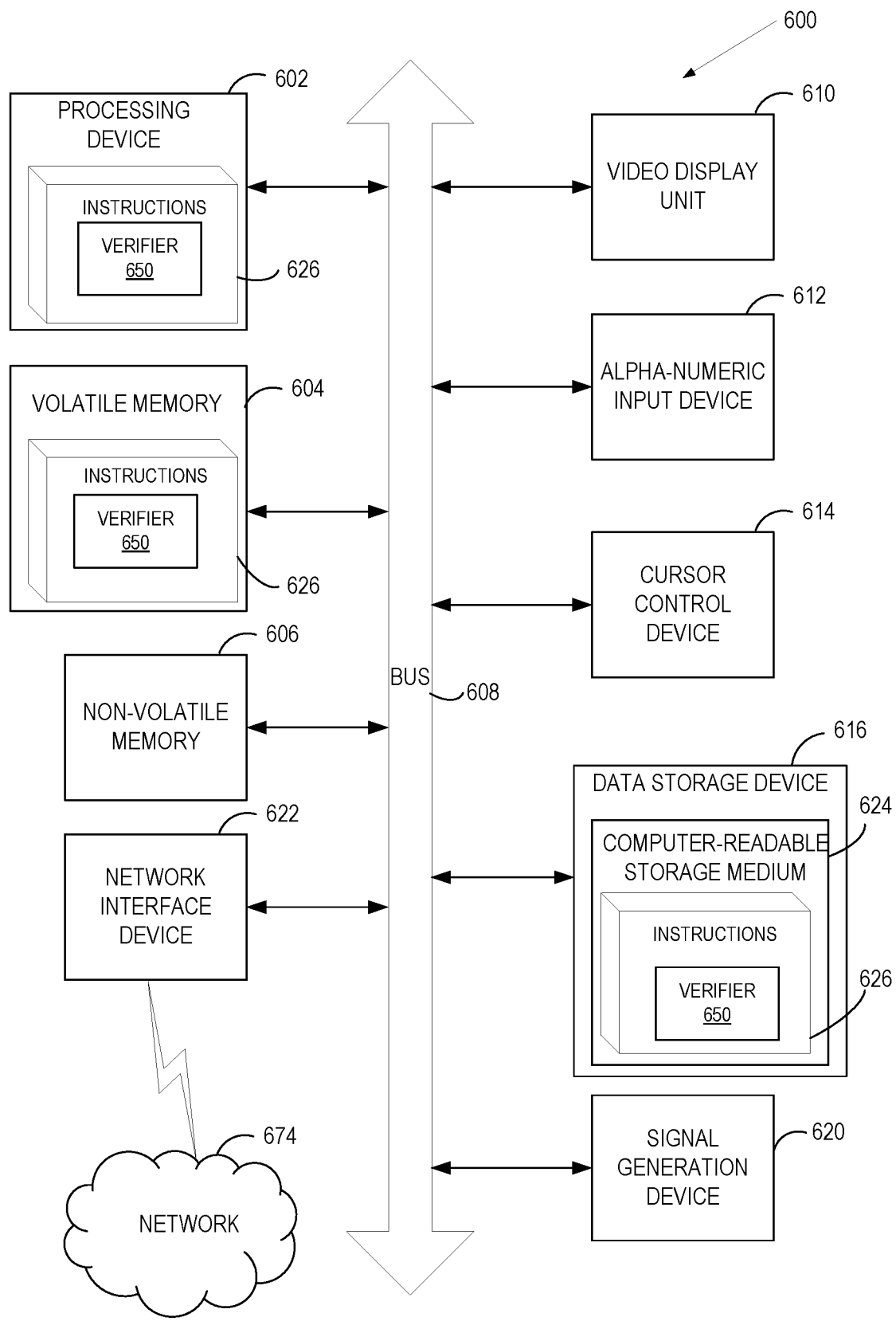
FIG. 6 depicts a block diagram of an illustrative computing device operating in accordance with the examples of the disclosure.

FIG. 6 depicts a block diagram of a computer system operating in accordance with one or more aspects of the present disclosure. In various illustrative examples, computer system 600 may correspond to a computing device 110 within system architecture 100 of FIG. 1. In one implementation, the computer system 600 may be the computer system 110 of FIG. 1. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions implementing method 200, method 400, and method 500 for verifier 650 (which may be the same as verifier 172 of FIG. 1) and the modules illustrated in FIGS. 1 and 3.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 400, and 500, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method for supporting hardware offload, the method comprising:
   receiving, by a privileged component of a computing system, bytecode of a network packet processing component from an unprivileged component of the computing system;
   determining, by the privileged component, whether a redirect flag maintained by the privileged component is set to obtain a determination of whether or not the redirect flag is set, wherein the redirect flag being set is indicative of the bytecode of the network packet processing component comprising at least one of: a first command that returns a redirect, or a second command that returns a runtime-computed value generated by the network packet processing component; and
   based on the determination of whether or not the redirect flag is set, performing one of:
     causing, by the privileged component, the network processing component to be offloaded to a hardware device corresponding to a device driver of the privileged component for execution as a hardware implementation of the network packet processing component when the redirect flag is not set; or
     causing, by the device driver of the privileged component, a software implementation of the network packet processing component to be executed within the privileged component when the redirect flag is set.

2. The method of claim 1, wherein the network packet processing component comprises a set of instructions implementing one or more rules to process network packets.

3. The method of claim 1, wherein the privileged component comprises at least one of a kernel of an operating system (OS) or a hypervisor.

4. The method of claim 1, wherein the unprivileged component comprises an application or a virtual machine (VM).

5. The method of claim 1, wherein the bytecode of the network packet processing component is generated, by the unprivileged component, via a call to a network packet processing component library that causes the network packet processing component to be compiled into the bytecode of the network packet processing component.

6. The method of claim 1, wherein the network packet processing component is an eXpress Data Path (XDP) application.

7. The method of claim 1, wherein the bytecode of network packet processing component comprises the second command, and wherein the method further comprises requesting enumeration of a set of run-time computed values comprising the run-time computed value generated by the network packet processing component.

8. The method of claim 1, further comprising: determining, by the privileged component, whether the bytecode of the network packet processing component comprises the second command, wherein the second command comprises an indirect branch instruction; and responsive to determining that the bytecode of the network processing component comprises the second command, setting, by the privileged component, the redirect flag.

9. The method of claim 8, wherein: the privileged component further comprises a redirect checker to determine whether the bytecode of the network packet processing component comprises the second command, and to set the redirect flag; and the device driver determines whether the redirect flag is set.

10. A system for supporting hardware offload, the system comprising:
a memory;
a processing device operatively coupled to the memory, the processing device to execute a privileged component of a computing system to:
receive, from an unprivileged component of the computing system, bytecode of a network packet processing component;
determine whether a redirect flag maintained by the privilege component is set to obtain a determination of whether or not the redirect flag is set, wherein the redirect flag being set is indicative of the bytecode of the network packet processing component comprising at least one of: a first command that returns a redirect, or a second command that returns a runtime-computed value generated by the network packet processing component; and
based on the determination of whether or not the redirect flag is set, perform at least one of:
cause the network processing component to be offloaded to a hardware device corresponding to a device driver of the privileged component for execution as a hardware implementation of the network packet processing component when the redirect flag is not set; or
cause, by the device driver of the privileged component, a software implementation of the network packet processing component to be executed within the privileged component when the redirect flag is set.

11. The system of claim 10, wherein the network packet processing component comprises a set of instructions implementing one or more rules to process network packets.

12. The system of claim 10, wherein the privileged component comprises at least one of a kernel of an operating system (OS) executed by the processing device or a hypervisor executed by the processing device.

13. The system of claim 10, wherein the unprivileged component comprises an application executed by the processing device or a virtual machine (VM) executed by the processing device.

14. The system of claim 10, wherein the bytecode of the network packet processing component is generated, by the unprivileged component, via a call to a network packet processing component library that causes the network packet processing component to be compiled into the bytecode of the network packet processing component.

15. The system of claim 10, wherein the network packet processing component is an eXpress Data Path (XDP) application.

16. A non-transitory computer-readable medium storing instructions for supporting hardware offload that, when executed by a processing device, cause the processing device to:
receive, by a privileged component of a computing system, bytecode of a network packet processing component from an unprivileged component of the computing system;
determine, by the privileged component, whether a redirect flag maintained by the privileged component is set to obtain a determination of whether or not the redirect flag is set, wherein the redirect flag being set is indicative of the bytecode of the network packet processing component comprising at least one of, a first command that returns a redirect, or a second command that returns a runtime-computed value generated by the network packet processing component; and
based on the determination of whether or not the redirect flag is set, perform at least one of:
cause, by the privileged component, the network processing component to be offloaded to a hardware device corresponding to a device driver of the privileged component for execution as a hardware implementation of the network packet processing component when the redirect flag is not set; or
cause, by the device driver of the privileged component, a software implementation of the network packet processing component to be executed within the privileged component when the redirect flag is set.

17. The non-transitory computer-readable medium of claim 16, wherein the network packet processing component comprises a set of instructions implementing one or more rules to process network packets.

18. The non-transitory computer-readable medium of claim 16, wherein the privileged component comprises at least one of a kernel of an operating system (OS) executed by the processing device or a hypervisor executed by the device, and wherein the unprivileged component comprises a second application executed by the processing device or a virtual machine (VM) executed by the processing device.

19. The non-transitory computer-readable medium of claim 16, wherein the second command is an indirect branch instruction.

* * * * *